United States Patent
Jung et al.

(10) Patent No.: US 7,321,396 B2
(45) Date of Patent: Jan. 22, 2008

(54) DEINTERLACING APPARATUS AND METHOD

(75) Inventors: You-young Jung, Suwon (KR); Young-ho Lee, Seoul (KR); Seung-joon Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 476 days.

(21) Appl. No.: 10/703,568

(22) Filed: Nov. 10, 2003

(65) Prior Publication Data

US 2004/0109085 A1    Jun. 10, 2004

(30) Foreign Application Priority Data

Dec. 10, 2002    (KR)    ............... 10-2002-0078434

(51) Int. Cl.
*H04N 7/01* (2006.01)
(52) U.S. Cl. .................................................... 348/452
(58) Field of Classification Search ................ 348/441, 348/448, 449, 451, 458, 459, 452
See application file for complete search history.

(56) References Cited

U.S. PATENT DOCUMENTS

| | | | | |
|---|---|---|---|---|
| 5,027,201 A | * | 6/1991 | Bernard | ................ 348/702 |
| 5,159,451 A | * | 10/1992 | Faroudja et al. | ............ 348/448 |
| 5,398,071 A | * | 3/1995 | Gove et al. | ................ 348/558 |
| 5,602,654 A | * | 2/1997 | Patti et al. | ................ 358/461 |
| 5,661,525 A | * | 8/1997 | Kovacevic et al. | ......... 348/452 |
| 5,777,682 A | * | 7/1998 | De Haan et al. | ............ 348/452 |
| 6,340,990 B1 | * | 1/2002 | Wilson | ........................ 348/448 |
| 6,380,978 B1 | * | 4/2002 | Adams et al. | ............. 348/452 |
| 6,606,126 B1 | * | 8/2003 | Lim et al. | .................. 348/452 |
| 6,625,333 B1 | * | 9/2003 | Wang et al. | ................ 382/300 |
| 7,039,109 B2 | * | 5/2006 | Pelagotti et al. | ....... 375/240.16 |
| 2004/0119887 A1 | * | 6/2004 | Franzen | ..................... 348/459 |

\* cited by examiner

*Primary Examiner*—Paulos M. Natnael
(74) *Attorney, Agent, or Firm*—Staas & Halsey LLP

(57) ABSTRACT

A deinterlacing apparatus and method thereof include a motion compensation unit implementing motion-compensated temporal interpolation for each of estimated motion vectors with reference to a previous field and a next field, which are respectively ahead of and behind a current field to be interpolated, producing interpolation values of a pixel to be interpolated, and outputting a selected value from the interpolation values as a first interpolation value. Further, a spatial interpolation unit producing a second interpolation value of the pixel to be interpolated using values of pixels around the pixel to be interpolated, and an output unit mixing the first and second interpolation.

17 Claims, 3 Drawing Sheets

DEINTERLACING APPARATUS AND METHOD

CROSS-REFERENCE TO RELATED APPLICATIONS

This application claims the benefit of Korean Application No. 2002-78434, filed Dec. 10, 2002, in the Korean Intellectual Property Office, the disclosure of which is incorporated herein by reference.

BACKGROUND OF THE INVENTION

1. Field of the Invention

The present invention relates to a deinterlacing apparatus and a method, and more particularly, to a deinterlacing apparatus and a method easily implemented and having a fast process speed, which calculate interpolation values and mixed values for estimated motion vectors, and use selected values as a final interpolation value and mixed value.

2. Description of the Related Art

An interlace scan mode and a progressive scan mode are provided as scan modes of an image display apparatus. The interlace scan mode is employed for general TVs and the like. The interlace scan mode is a mode that, when one image is displayed, divides one image frame into two fields and sequentially and alternately displays the fields on a screen to form an image. At this time, the two fields are referred to as a top field and a bottom field, an upper field and a lower field, an odd field and an even field, or the like.

Furthermore, the progressive scan or a non-interlace scan mode is used for computer monitors, digital TVs, and so on. The non-interlace scan mode is a mode that treats one frame image as a frame unit and displays full frame images at a time like a projecting film on the screen.

A deinterlacing apparatus refers to a device that converts a video signal of the interlace scan mode into a video signal of the progressive scan mode. Video display devices using the progressive scan mode increase in number, and, at the same time, a necessity to exchange data between different scan modes is also increasing, so that the deinterlacing apparatus is required to convert the interlace scan mode to the progressive scan mode.

Diverse methods can be implemented for the deinterlacing or an interpolation method may be used converting the video signal of the interlacing scan mode into the video signal of the progressive scan mode. As a basic method, there is the line replication method replicating line information of a present field to be interpolated. The basic method can be easily implemented, but has a disadvantage that a resolution of the interpolated images falls to a half and a specific image at a specific time can completely disappear.

In order to overcome such a disadvantage, a spatial interpolation method has been developed to implement new fields through a process of inserting an average data of two line data between two lines of a present field, and a temporal interpolation method having no motion compensation but implementing frames by using field lines before and after a present field, between present field lines. Such methods may be implemented in simple hardware, but the methods can generate errors in case of interpolating the images in motion or degrade an image quality due to deteriorations of the interpolated images.

In order to make up for the above disadvantages, the motion-compensated interpolation method has been developed which divides the image into blocks over a continuous field data with reference to a present field data, obtains motions over the respective blocks, and interpolates a present frame image with reference to motion vectors. Such a motion-compensated method is disclosed in U.S. Pat. No. 5,777,682 issued Jul. 7, 1998.

In addition, the motion-adaptive interpolation method estimates an extent of motion and interpolates frames depending upon motions. Such a motion-adaptive interpolation method is disclosed in U.S. Pat. No. 5,027,201 issued Jun. 25, 1991, and U.S. Pat. No. 5,159,451 issued Oct. 27, 1992, and so on.

However, the motion-adaptive interpolation method is relatively simple in a hardware structure so that the motion-adaptive interpolation method can be easily implemented at less cost, but has a problem of deteriorating the performance for image quality improvements. Further, the motion-compensated interpolation method requires a large number of pixel data from a current to-be-interpolated field and reference fields for motion estimations, so the motion-compensated interpolation method needs to access massive amounts of data from a field or frame memory or to store data in a buffer of large capacity, which makes implementations complicated and the implementation cost high.

Further, the motion-compensated interpolation method generally uses unit block motion vectors for the motion estimations and compensations, so that, because error corrections are carried out for every block unit, a block artifact occurs on interpolated images from time to time. Accordingly, a subsequent process to prevent the artifact is needed, which brings out a problem of making an overall hardware structure considerably complicated.

SUMMARY OF THE INVENTION

The present invention has been devised to solve the above and/or problems, so according to an aspect of the present invention, there is provided a deinterlacing apparatus and method efficiently performing motion compensations, easily implemented, and having a fast processing speed.

Additional aspects and/or advantages of the invention will be set forth in part in the description which follows and, in part, will be obvious from the description, or may be learned by practice of the invention.

In order to achieve the above aspect, a deinterlacing apparatus, according to the present invention, includes a motion compensation unit implementing motion-compensated temporal interpolation for each estimated motion vector with reference to a previous field and a next field, which are respectively ahead of and behind a current field to be interpolated, producing interpolation values of a pixel to be interpolated, and outputting a selected value from the interpolation values as a first interpolation value; a spatial interpolation unit producing a second interpolation value of the pixel to be interpolated using values of pixels around the pixel to be interpolated; and an output unit mixing the first and second interpolation values with a weighted value and outputting a value indicative thereof.

According to an aspect of the present invention, the motion compensation device calculates a mixed value based on motion information with respect to the pixel to be interpolated for each of the estimated motion vectors, and outputs as the weighted value a selected value of mixed values. Further, the motion compensation device further calculates a summed absolute difference (SAD) value by unit of a search area in which a position is set with reference to the estimated motion vectors based on the next and previous fields, and selects the first interpolation value and the weighted value based on SAD values.

The motion compensation device may include motion compensation assistant units each producing an interpolation value, the SAD value, and the mixed value for each of the estimated motion vectors; and a selection unit outputting as the first interpolation value and the weighted value the selected value from the interpolation values and the selected value from the mixed values based on the SAD values.

At this time, it is possible that the motion compensation assistant parts each include an SAD calculation unit calculating the SAD value; a motion information unit producing the mixed value; and a temporal interpolation unit calculating the interpolation value. In here, the SAD calculation unit may include a segment SAD calculator calculating a segment SAD value with respect to a line having a size; an SAD buffer storing line by line segment SAD values calculated from the segment SAD calculator; and a block SAD calculator adding the segment SAD values stored in the SAD buffer and calculating the SAD value.

The motion information unit may include a motion information calculator calculating a motion information value indicating an extent of motion between the previous field and the next field with reference to the pixel to be interpolated; a motion information buffer storing the mixed value corresponding to the motion information; and a weight value calculator calculating the mixed value with reference to the motion information buffer.

According to an aspect of the present invention, the selection device includes a first multiplexer outputting any one of the interpolation values as the first interpolation value; a second multiplexer outputting any one of the mixed values as the weight value; and a motion selection unit controlling outputs of the first and second multiplexers based on the SAD values. At this time, the motion selection part may control selecting the interpolation value and the mixed value corresponding to the estimated motion vector producing the least SAD value of the SAD values.

Furthermore, a deinterlacing method includes implementing motion-compensated temporal interpolation for each of estimated motion vectors with reference to a previous field and a next field, which are respectively ahead of and behind a current field to be interpolated, producing interpolation values for a pixel to be interpolated, and outputting a selected value of the interpolation values as a first interpolation value; producing a second interpolation value of the pixel using values of pixels around the pixel to be interpolated; and mixing the first and second interpolation values with a weighted value and outputting a value indicative thereof.

According to an aspect of the present invention, the implementation further includes calculating a mixed value based on motion information with respect to the pixel to be interpolated of each of the estimated motion vectors, and outputting as a weighted value a selected value of mixed values. Further, implementation further includes calculating a summed absolute difference (SAD) value by unit of a search area in which a position is set with reference to the estimated motion vectors based on the next and previous fields, and selecting the first interpolation value and the weighted value based on SAD values.

The implementing motion-compensated temporal interpolation includes: producing the interpolation values, SAD values, and mixed values for the estimated motion vectors; and outputting a value selected from the interpolation values and a value selected from the mixed values based on the SAD values.

The producing of the interpolation values, SAD values, and mixed values includes: calculating the SAD values; producing the mixed values; and calculating the interpolation values. In here, the calculation of the SAD values includes: calculating a segment SAD value with respect to each line having a size; storing line by line segment SAD values; and adding the stored segment SAD values and calculating the SAD value. The producing of the mixed values includes calculating a motion information value indicating an extent of a motion between the previous field and the next field with reference to the pixel to be interpolated; and referring to the stored mixed values corresponding to the motion information value, and calculating the mixed values.

Further, the outputting of the values selected from the interpolation values and the mixed values may control selecting an interpolation value and a mixed value corresponding to an estimated motion vector producing a least SAD value of the SAD values.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
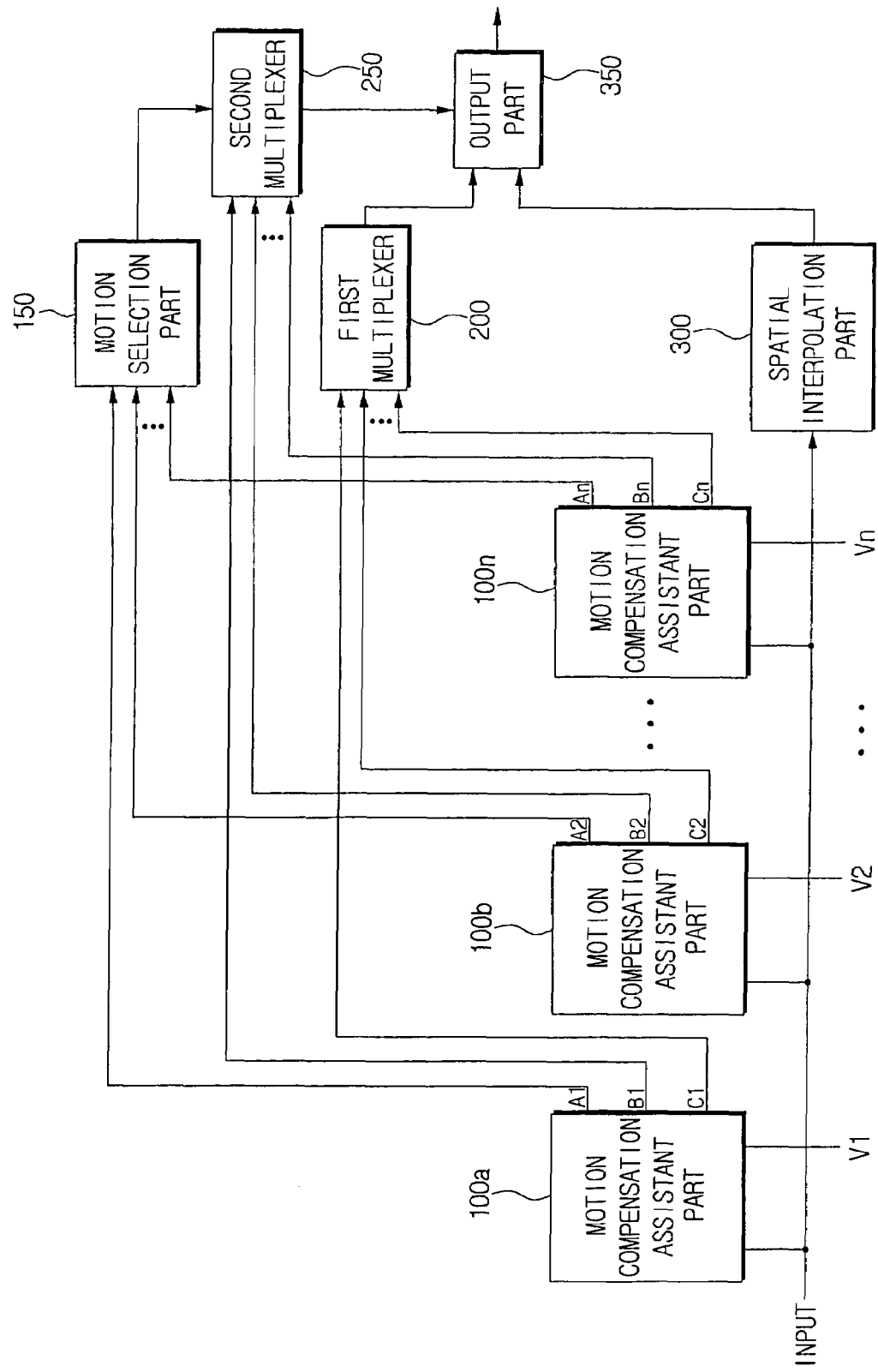
FIG. 1 is a block diagram showing a deinterlacing apparatus, according to an aspect of the present invention.

Reference will now be made in detail to the aspects of the present invention, examples of which are illustrated in the accompanying drawings, wherein like reference numerals refer to the like elements throughout. The aspects are described below to explain the present invention by referring to the figures.

FIG. 1 is a block diagram showing a deinterlacing apparatus, according to an aspect of the present invention. The deinterlacing apparatus has motion compensation assistant parts 100a to 100n, a motion selection part 150, a first multiplexer 200, a second multiplexer 250, a spatial interpolation part 300, and an output part 350.

The motion compensation assistant parts 100a to 100n each have the same structure, sequentially input time-continuous fields of interlace scan mode, and input estimated motion vectors V1 to Vn, respectively. At this time, a field to be currently interpolated is referred to as a current field, and fields ahead of or behind the current field in time are referred to as a previous field and a next field, respectively. Further, the estimated motion vectors V1 to Vn input to the motion compensation assistant parts 100a to 100n, respectively, are not motion vectors calculated through motion detections, but estimated motion vectors.

It is necessary for interpolations to find the most similar block to the current field between the previous field of a reference field and the next field, which is referred to as a motion estimation, and a displacement indicating how far a block has been moved is referred to a motion vector. That is, the motion vector is two-dimensional information, which indicates the movement of the block in the reference field and the current field in a movement amount on the X-Y coordinates of two-dimension. Accordingly, the motion vector includes a movement magnitude in a horizontal direction and a movement magnitude in a vertical direction, and it is usual to take in a corresponding block at a position to which such a motion vector points for interpolation. However, according to an aspect of the present invention, the deinterlacing apparatus uses estimated motion vectors V1 to Vn, calculates interpolation values at positions to which corresponding estimated motion vectors point, and selects one of the calculated interpolation values.

Accordingly, the motion compensation assistant parts 100a to 100n refer to corresponding areas to which the input estimated motion vectors V1 to Vn point with reference to a previous field and a next field, and calculate summed absolute difference SAD values A1 to An, mixed values B1 to Bn for a mixture of a temporal interpolation value and a spatial interpolation value, and interpolation values C1 to Cn for motion-compensated temporal interpolations.

The motion selection part 150 selects any one output of the respective motion compensation assistant parts 100a to 100n based on the respective SAD values A1 to An output from the respective motion compensation assistant parts 100a to 100n, and; accordingly, controls a selection of output values the first and second multiplexers 200 and 250. With such controls, the first and second multiplexers 200 and 250 output to the output part 350, as a first interpolation value and a weighted value α, any value selected out of the mixed values B1 to Bn and the interpolation values C1 to Cn, respectively, that are output from the motion compensation assistant parts 100a to 100n.

The spatial interpolation part 300 implements spatial interpolations using values of pixels around a pixel to be interpolated in a current field so as to calculate a second interpolation value for the pixel to be interpolated.

The output part 350 mixes a first interpolation value output from the first multiplexer 200, a second interpolation value output from the spatial interpolation part 300, and the weighted value a output from the second multiplexer 250. A value output from the output part 350 becomes a final interpolation value.

Figure 2:
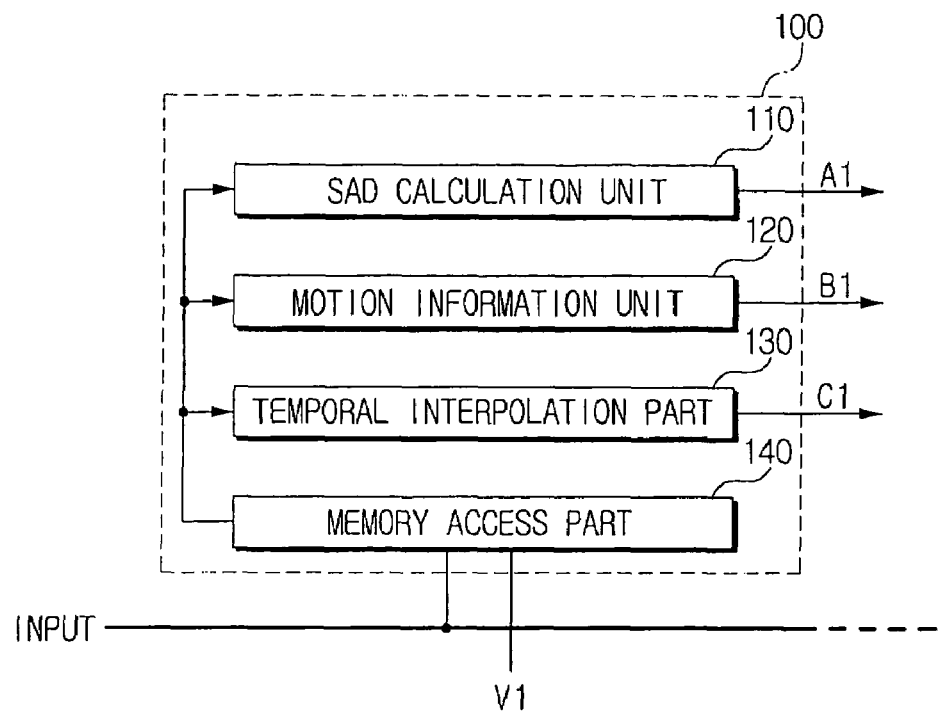
FIG. 2 is a block diagram showing in detail a motion compensation assistant part of FIG. 1.

FIG. 2 is a block diagram showing in detail a first motion compensation assistant part 100a of the motion compensation assistant parts 100a to 100n of FIG. 1. All the motion compensation assistant parts 100a to 100n have the same structure.

In FIG. 2, the motion compensation assistant part 100a has an SAD calculation unit 110, a motion information unit 120, a temporal interpolation unit 130, and a memory access unit 140.

Figure 3:
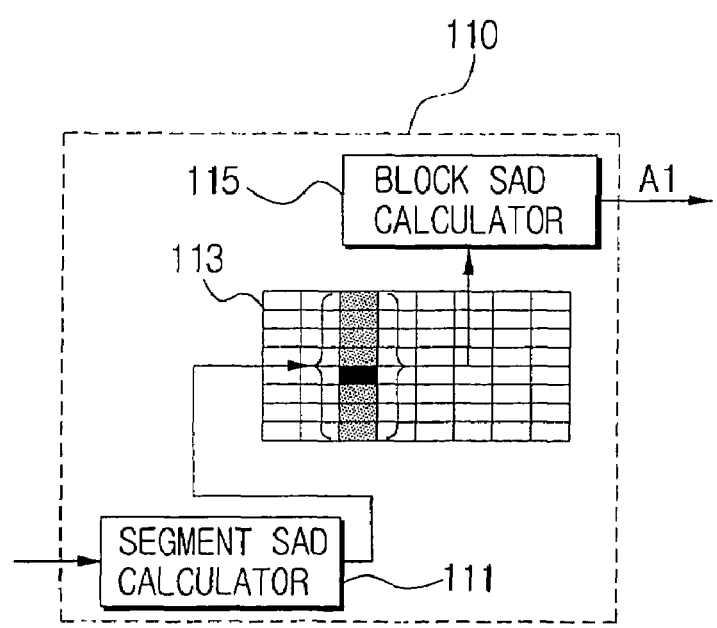
FIG. 3 is a block diagram showing in detail an SAD calculation part of FIG. 2.

The SAD calculation unit 110 compares the image corresponding to a macro block of a predetermined size at a position to which the estimated motion vector V1 points with reference to the previous field and the next field, and calculates a value. The SAD calculation unit 110, as shown in FIG. 3, has a segment SAD calculator 111, an SAD buffer 113, and a block SAD calculator 115. At this time, the segment SAD calculator 111 compares the image corresponding to a line segment of certain size at a position set with reference to an estimated motion vector in the previous field and the next field, and calculates a line SAD value. The calculated line SAD value is sent to the SAD buffer 113. The SAD buffer 113 stores line SAD values of line segments matching positions of each line of the macro block. The block SAD calculator 115 adds all the values stored in the SAD buffer 113 so that a value corresponding to the SAD value of a macro block can be calculated.

Figure 4:
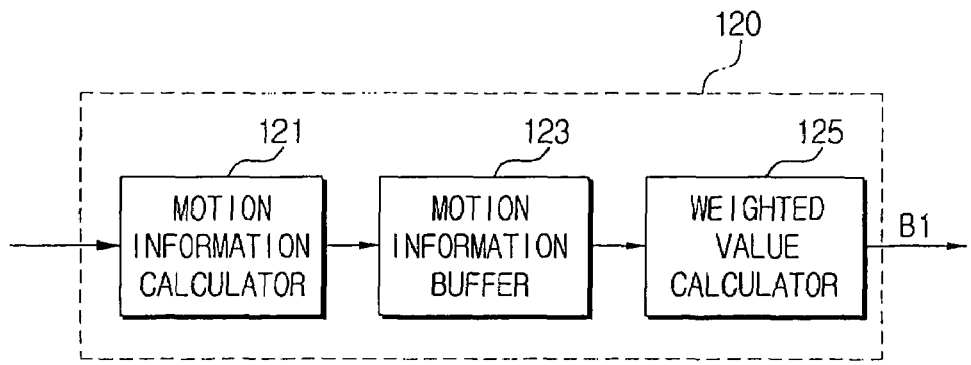
FIG. 4 is a block diagram showing a motion information part of FIG. 2.

The motion information unit 120 calculates motion information pixel by pixel between the previous field and the next field with reference to a current field pixel to be interpolated. Here, an area to be referred to in the previous field and the next field becomes one to which the input estimated motion vector V1 points. The motion compensation assistant part 100 calculates a mixed value for mixture based on the calculated motion information. The motion information unit 120, as shown in FIG. 4, may have a motion information calculator 121, a motion information buffer 123, a weighted value calculator 125. In this case, the motion information calculator 121 detects motion information values indicating whether there are motions of individual pixels of the current field to be interpolated with reference to the estimated motion vector V1. The detected motion information values are sent to and stored in the motion information buffer 123. The motion information buffer 123 stores in a table format mixed values corresponding to respective motion information values, and the weighted value calculator 125 refers to the table, and selects and outputs one of the mixed values stored in the search table based on the motion information output from the motion information calculator 121. At this time, the output mixed values become either a 0 or a 1.

The temporal interpolation unit 130 refers to areas of the previous and next fields which point to the input estimated motion vector V1, implements motion-compensated temporal interpolations, and calculates interpolation values for the pixels to be interpolated.

The memory access unit 140 stores lines around current field pixels to be interpolated, and corresponding areas to which the estimated motion vector V1 in the previous and next fields points, and provides the stored lines and areas to the SAD calculation unit 110, the motion information unit 120, and temporal interpolation unit 130, respectively.

The above operation process is implemented in the same manner in all the motion compensation assistant parts 100a to 100n, but areas of the previous and next fields to be referred to vary when the SAD values, the motion information values, and the interpolation values are calculated depending upon input estimated motion vectors V1 to Vn.

Figure 5:
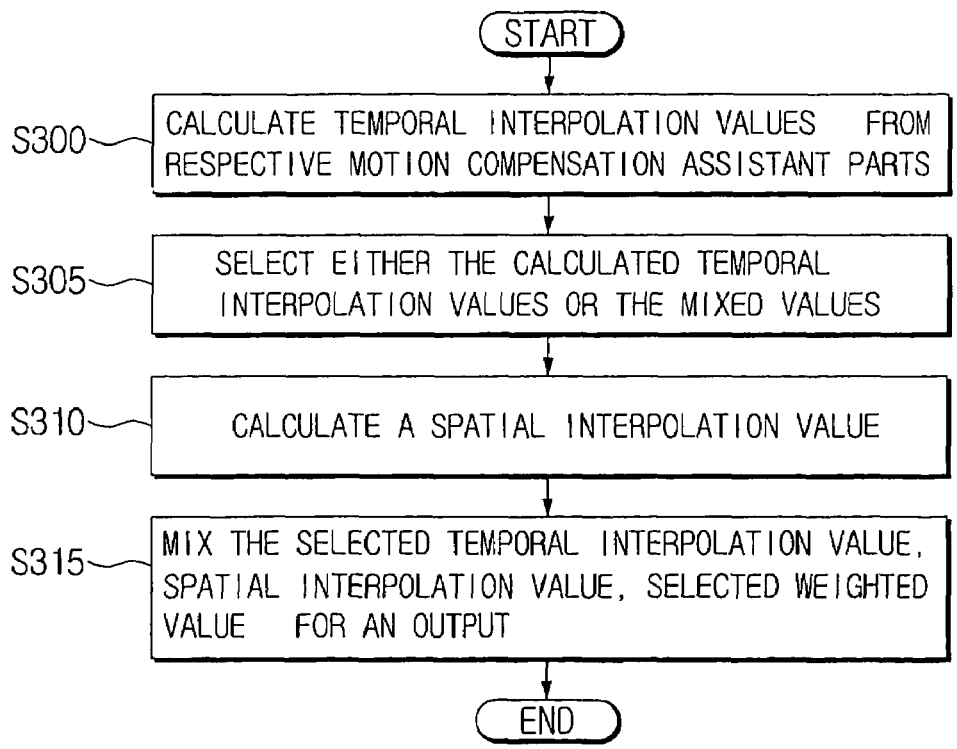
FIG. 5 is a flow chart explaining operations of the deinterlacing apparatus, according to an aspect of the present invention.

FIG. 5 is a flow chart explaining operations of the deinterlacing apparatus, according to an aspect of the present invention. Referring to FIG. 5, at operation S300, the respective motion compensation assistant parts 100a to 100n input time-continuous fields, and input different estimated motion vectors V1 to Vn, and output the interpolation values and the mixed values or the weighted values α. The motion compensation assistant parts 100a to 100n simultaneously calculate the SAD values, referring to the estimated motion vectors.

The motion selection part 150 selects a motion compensation assistant part calculating the least SAD value, referring to the SAD values calculated from the respective motion compensation assistant parts 100a to 100n. Accordingly, at operation S305, the motion selection part 150 controls the selection of the output values of the first and second multiplexers 200 and 250 to transfer to the output part 350 the interpolation value and the weighted value, which are calculated from the motion compensation assistant part calculating a least SAD value, to thereby select either the temporal interpolation values or the mixed values (or weighted values), both calculated by the motion compensation assistant parts 100a to 100n. The temporal interpolation values or the mixed values are selected because an estimated motion vector for the least SAD value calculated is a genuine motion vector indicating best the motion of the pixel to be currently interpolated.

At operation S310, the spatial interpolation part 300 uses the values of the pixels around the current field pixel to be interpolated and calculates the spatial interpolation value as to the pixel to be interpolated.

At operation S315, the output part 350 mixes a temporal interpolation value output from the second multiplexer 200 and the spatial interpolation value output from the spatial interpolation part 300 with a weighted value output from the second multiplexer 250 for an output indicative thereof. That is, a final interpolation value output from the output part 350 is any one of the temporal interpolation value, the spatial interpolation value, and the mixed value obtained from mixing the temporal interpolation value and the spatial interpolation value with a weighted value, the value of which becoming the final interpolation value.

The method, according to an aspect of the present invention, simultaneously calculates interpolation values, weighted values, and so on for respective estimated motion vectors, and selects any one of the values for interpolations, differing from a conventional method. The method according to an aspect of the present invention, calculates motion vectors through motion detection, calculates interpolation values and so on with reference to the calculated motion vectors, and implements interpolations. The method, according to an aspect of the present invention, has an advantage in view of a memory size necessary for motion detections, a memory access speed, and so on, to thereby be easily implemented and enhance a processing speed.

As described above, according to an aspect of the present invention, there is provided a deinterlacing apparatus and method that simultaneously calculate an interpolation value and a weighted value using an estimated motion vector and selecting one of the values, being easily implemented and having a fast processing speed.

Although a few aspects of the present invention have been shown and described, it would be appreciated by those skilled in the art that changes may be made in this embodiment without departing from the principles and spirit of the invention, the scope of which is defined in the claims and their equivalents.

What is claimed is:

1. A deinterlacing apparatus, comprising:
 a motion compensation unit implementing motion-compensated temporal interpolation for each of estimated motion vectors with reference to a previous field and a next field, which are respectively ahead of and behind a current field to be interpolated, producing interpolation values of a pixel to be interpolated, and outputting a selected value from the interpolation values as a first interpolation value;
 a spatial interpolation unit producing a second interpolation value of the pixel to be interpolated using values of pixels around the pixel to be interpolated; and
 an output unit mixing the first and second interpolation values with a weighted value and outputting a value indicative thereof.

2. The deinterlacing apparatus as claimed in claim 1, wherein the motion compensation unit further calculates mixed values based on motion information with respect to the pixel to be interpolated for the estimated motion vectors, and outputs, as the weighted value, a selected value from the mixed values.

3. The deinterlacing apparatus as claimed in claim 2, wherein the motion compensation unit further calculates a summed absolute difference (SAD) value by unit of a search area in which a position is set with reference to the estimated motion vectors based on the next and previous fields, and selects the first interpolation value and the weighted value based on SAD values.

4. The deinterlacing apparatus as claimed in claim 3, wherein the motion compensation unit comprises:
 motion compensation assistant units each producing an interpolation value, the SAD value, and the mixed value for each of the estimated motion vectors; and
 a selection unit outputting as the first interpolation value and the weighted value the selected value from the interpolation values and the selected value from the mixed values based on the SAD values.

5. The deinterlacing apparatus as claimed in claim 4, wherein the motion compensation assistant units each comprises:
 an SAD calculation unit calculating the SAD value;
 a motion information unit producing the mixed value; and
 a temporal interpolation unit calculating the interpolation value.

6. The deinterlacing apparatus as claimed in claim 5, wherein the SAD calculation unit comprises: p1 a segment SAD calculator calculating a segment SAD value with respect to a line having a size;
 an SAD buffer storing line by line segment SAD values calculated from the segment SAD calculator; and
 a block SAD calculator adding the segment SAD values stored in the SAD buffer and calculating the SAD value.

7. The deinterlacing apparatus as claimed in claim 5, wherein the motion information unit comprises:
 a motion information calculator calculating a motion information value indicating an extent of motion between the previous field and the next field with reference to the pixel to be interpolated;
 a motion information buffer storing the mixed value corresponding to the motion information; and
 a weight value calculator calculating the mixed value with reference to the motion information buffer.

8. The deinterlacing apparatus as claimed in claim 4, wherein the selection unit comprises:
 a first multiplexer outputting any one of the interpolation values as the first interpolation value;
 a second multiplexer outputting any one of the mixed values as the weight value; and
 a motion selection unit controlling outputs of the first and second multiplexers based on the SAD values.

9. The deinterlacing apparatus as claimed in claim 8, wherein the motion selection unit controls selecting the interpolation value and the mixed value corresponding to the estimated motion vector producing the least SAD value of the SAD values.

10. A deinterlacing method, comprising:
 implementing motion-compensated temporal interpolation for each of estimated motion vectors with reference to a previous field and a next field, which are respectively ahead of and behind a current field to be interpolated, producing interpolation values for a pixel to be interpolated, and outputting a selected value of the interpolation values as a first interpolation value;
 producing a second interpolation value of the pixel using values of pixels around the pixel to be interpolated; and
 mixing the first and second interpolation values with a weighted value and outputting a value indicative thereof.

11. The deinterlacing method as claimed in claim 10, wherein the implementation further comprises calculating mixed values based on motion information with respect to the pixel to be interpolated of the estimated motion vectors, and outputting as a weighted value a selected value from the mixed values.

12. The deinterlacing method as claimed in claim 11, wherein the implementation further comprises calculating a summed absolute difference (SAD) value by unit of a search area in which a position is set with reference to the estimated motion vectors based on the next and previous fields, and selecting the first interpolation value and the weighted value based on SAD values.

13. The deinterlacing method as claimed in claim 12, wherein the implementing motion-compensated temporal interpolation comprises:
   producing the interpolation values, SAD values, and mixed values for the estimated motion vectors; and
   outputting a value selected from the interpolation values and a value selected from the mixed values based on the SAD values.

14. The deinterlacing method as claimed in claim 13, wherein the producing of the interpolation values, the SAD values, and the mixed values comprises:
   calculating the SAD values;
   producing the mixed values; and
   calculating the interpolation values.

15. The deinterlacing method as claimed in claim 14, wherein the calculation of the SAD values comprises:
   calculating a segment SAD value with respect to each line having a size;
   storing line by line segment SAD values; and
   adding the stored segment SAD values and calculating the SAD value.

16. The deinterlacing method as claimed in claim 14, wherein the producing of the mixed values comprises:
   calculating a motion information value indicating an extent of a motion between the previous field and the next field with reference to the pixel to be interpolated; and
   referring to the stored mixed values corresponding to the motion information value, and calculating the mixed values.

17. The deinterlacing method as claimed in claim 13, wherein the outputting of the values selected from the interpolation values and the mixed values controls selecting an interpolation value and a mixed value corresponding to an estimated motion vector producing a least SAD value of the SAD values.

* * * * *

UNITED STATES PATENT AND TRADEMARK OFFICE
CERTIFICATE OF CORRECTION

PATENT NO. : 7,321,396 B2  Page 1 of 1
APPLICATION NO. : 10/703568
DATED : January 22, 2008
INVENTOR(S) : You-Young Jung et al.

It is certified that error appears in the above-identified patent and that said Letters Patent is hereby corrected as shown below:

Column 8, Line 22, after "comprises:" delete "p1".

Signed and Sealed this

Eighth Day of July, 2008

JON W. DUDAS
*Director of the United States Patent and Trademark Office*